United States Patent [19]

Hartung et al.

[11] Patent Number: 4,533,996

[45] Date of Patent: Aug. 6, 1985

[54] PERIPHERAL SYSTEMS ACCOMMODATION OF GUEST OPERATING SYSTEMS

[75] Inventors: Michael H. Hartung, Pima County, Ariz.; Kenneth P. Nolan, Boulder County, Colo.

[73] Assignee: International Business Machines Corporation, Armonk, N.Y.

[21] Appl. No.: 351,558

[22] Filed: Feb. 23, 1982

[51] Int. Cl.³ .............................................. G06F 4/00
[52] U.S. Cl. .................................................... 364/200
[58] Field of Search ... 364/200 MS File, 900 MS File

[56] References Cited

U.S. PATENT DOCUMENTS

| 4,205,374 | 5/1980 | Bardsley et al. | 364/200 |
| 4,207,609 | 6/1980 | Luiz et al. | 364/200 |
| 4,354,225 | 10/1982 | Frieder et al. | 364/200 |
| 4,399,504 | 8/1983 | Obermarck et al. | 364/200 |
| 4,403,288 | 9/1983 | Christian et al. | 364/200 |

Primary Examiner—Eddie P. Chan
Assistant Examiner—John G. Mills
Attorney, Agent, or Firm—H. F. Somermeyer

[57] ABSTRACT

A peripheral system attached to a host having plural virtual machines accommodates the virtual machines via "guest" attribute signals signifying that a given chain of peripheral or I/O commands are virtual machine sourced (GO bit). The attribute signals may include modifier control signals to enable the peripheral system to adjust to virtual machine operations of the host. In particular, virtual machine "minidisks" are accommodated.

2 Claims, 10 Drawing Figures

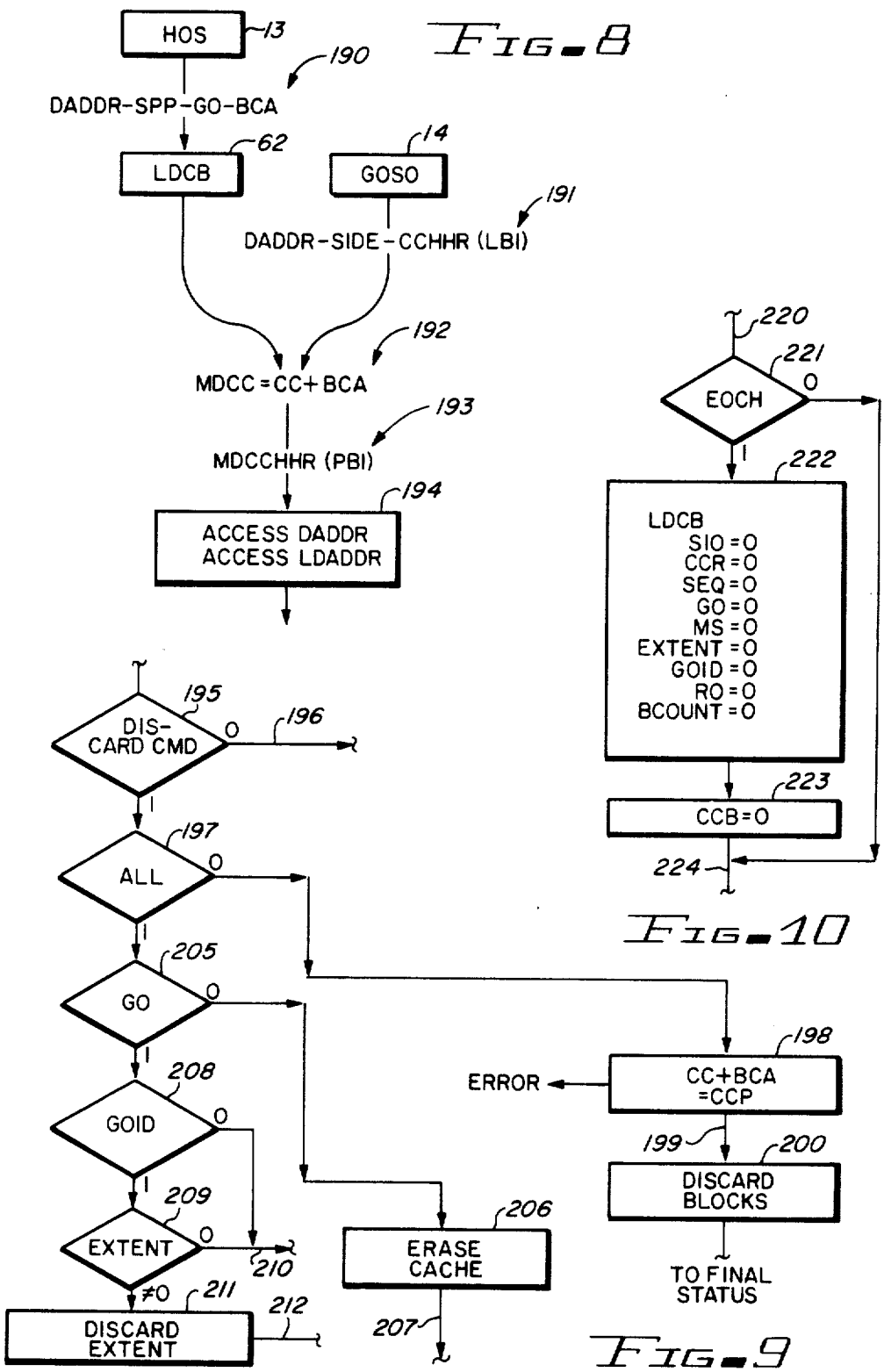

PERIPHERAL SYSTEMS ACCOMMODATION OF GUEST OPERATING SYSTEMS

FIELD OF THE INVENTION

The present invention relates to data processing systems, particularly to peripheral systems attachable to hosts having a plurality of virtual machines with a plurality of guest operating systems and a host operating system.

BACKGROUND OF THE INVENTION

As an aid in multiprocessing, many hosts employ what is termed virtual machines; each virtual machine is also referred to as a guest. Each guest has its own operating system and functions as an independent machine. The architecture of such a host includes a level 0 architecture having a central processor, hardware and microcode on which all of the programming constituting the host operating system and the quest operating systems resides. Such hardware includes a cache, a calculator, program status words, a main memory and the like, as is well known in the art. A level 1 architectural level for the host includes a system control program and hardware including main storage that operates with the above-described central processing hardware and microcode. Level 1 includes the host control, including its operating system. Level 2 includes all of the virtual machines with their respective operating systems. Level 3 includes all of the users in each of the respective virtual machines. All input and output operations for either the host or the various guests are intercepted by the host operating system such that all peripheral controls require host operating system intervention for each and every one of the virtual machines. Putting this statement another way, all peripheral operations are on a host basis rather than on a virtual machine basis. It is desired to enable the virtual machines to directly access peripheral systems in such a manner that system integrity is maintained and interruption of the host operating system by quest input-output operations is minimized.

In the above-described virtual environment, a paging and swapping storage system typically stores the programs of computer instructions and other control data associable with the various host operating system and guests. Other input-output is also connected to the various virtual machines through mechanisms similar to that provided for handling paging and swapping operations for establishing and continuing operations in the virtual environment. Because of the key nature of paging and swapping, the present invention is described in its best mode as applied to this aspect of peripheral systems in a virtual environment.

Input-output operations are typically handled in so-called chains of command, also referred to as IO chaining. Each chain of commands usually relates to a single source, such as the host operating system or one of the guests. A host control of such peripheral or input-output chains includes the peripheral system generation of logical and physical addresses for data stored or manipulated by the peripheral system. As an example, a peripheral system which can be a tape storage system assigns logical and physical values to arrange the data signals received from a host into blocks of such signals. The host can retrieve such assigned values for later use in locating blocks of signals as well as for error recovery purposes. In buffered peripheral systems, such logical and physical values assigned during execution of chains of command can identify current status of various data buffers in the peripheral system.

Another host-exercised peripheral control is the limitation on the types of commands usable within a chain of commands. For example, a well-known mode set command can include a system control bit (SC) which signifies whether or not later-occurring commands in the chain of command can be of the supervisory type, i.e. commands that result in changes of peripheral system operations such as logical partitioning of various peripheral devices, resulting in operator's control messages related to the operation of the peripheral system controls relating to multipath reconnections, purging data from buffers and the like. Such SC control lasts only for the duration of a chain of commands and for those commands occurring after receipt of a mode set command signifying the limitation. Other peripheral systems have enabled emulation of one host having a low capacity to a host having a higher capacity in the air recovery area. For example, in U.S. Pat. No. 3,721,961 a CPU type of a first class is emulated to a CPU of a second class for error recovery purposes through peripheral system action. While all of the above-described functions provide for a great diversity of data processing operations there has yet to be provided an efficient peripheral system accommodation of virtual systems having a plurality of guest operating systems of diverse types.

SUMMARY OF THE INVENTION

It is an object of the invention to provide a peripheral system method and apparatus attachable to a host having a plurality of guests which accommodate the guests in a manner to maintain system integrity while minimizing host supervision of the various guest peripheral operations.

In accordance with one aspect of the invention, for each chain of commands being sent to the peripheral system by the host, an indicator indicates whether the source of the chain is a guest or a host operating system. The peripheral system has first means responsive to the host operating source indicated commands to translate the commands and execute same in the peripheral system in accordance with the indications contained within the respective commands. Second means are responsive to the indicator indicating a guest operating system as a source of the commands within the chain of commands to execute these commands within the peripheral system in joint accordance with the indications of the guest and the indications contained within the respective commands such that the command executions are modified from the host command executions in accordance with the guest indications. Such controls serve not only to limit the control exercised over the peripheral systems by the guest but also adjust the operation to accommodate the assigned characteristics of the guest operating system.

In a particular aspect of the invention, the peripheral system is a data storage system having a caching buffer with means for moving data between the caching buffer and a backing store. The peripheral commands are received in the series of commands from a host having a host operating system and a plurality of guest operating systems. The peripheral system has a directory indicating data storage locations in the caching buffer currently allocated for storing data related to directory-indicated ones of the data storage locations in the backing store. The peripheral system receives and stores signals from the host for indicating that a given series of commands will be sent to the peripheral data storage system from a one of said guest operating systems for accessing predetermined ones of the addressable data storage locations of said backing store using predetermined virtual addresses relatable to said guest operating systems. In particular, a peripheral system receives a command from the host in a series of commands which are time interleaved with various other chains of commands. However, for each received command, the peripheral system examines the storage signals to determine whether or not the received command is a command in any one of the given series of commands, i.e. related to a guest operating system. When the received command is not in any of the said given series of commands, then the peripheral system executes the received command with no alteration and without checking the storage signals. When the received command is one of said given series of commands as arising from a guest operating system, then the peripheral system examines the storage signals and modifies execution of the received command in accordance with the storage signals. In a given implementation, the modification is an adjustment of the address of the backing store for enabling physical access to a range of data storage locations assigned to the guest by the host and using the virtual address for verifying appropriate accessing by the peripheral system of the indicated data storage location.

The foregoing and other objects, features, and advantages of the invention will be apparent from the following more particular description of the preferred embodiments of the invention, as illustrated in the accompanying drawings.

DESCRIPTION OF THE DRAWINGS

FIG. 8 is a simplified diagrammatic showing of addressing control in the FIG. 4 illustrated peripheral system.

FIG. 9 illustrates machine operations relating to a supervisory command concerned with discarding data from a caching buffer of the FIG. 4 illustrated peripheral system.

FIG. 10 is a machine operations chart showing post-chain peripheral systems operations relating to the practice of the present invention in the FIG. 4 illustrated peripheral system.

DETAILED DESCRIPTION

Figure 1:
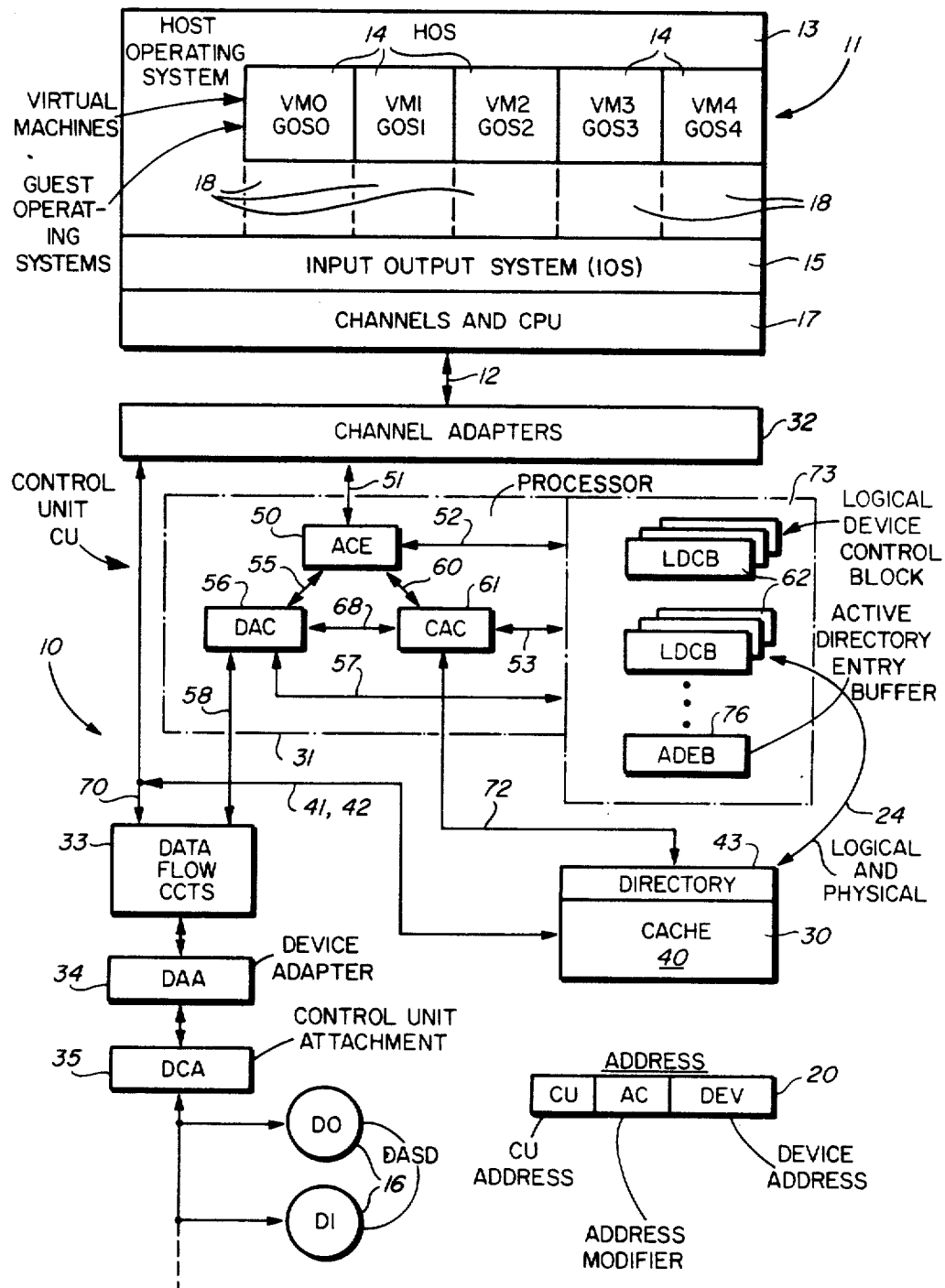
FIG. 1 is a block diagram of a host and peripheral data storage system incorporating the teachings of the present invention.

Referring now more particularly to the drawing, like numerals indicate like parts and structural features in the various diagrams. Referring particularly to FIG. 1, a host 11 is coupled to a peripheral system 10 via the usual input-output connection 12. The host 11 includes a host operating system HOS 13 which supports a plurality of virtual machines 14. Each virtual machine, separately denominated as VM 0 through VM 4, includes guest operating systems GOS 0 through GOS 4. The host operating system also includes input-output system IOS 15 which couples the virtual machines and HOS 13 to a set of channels in the hardware CPUs 17 for providing communications to the peripheral system 10. Each of the virtual machines has a logical connection to the channels via IOS 15 as indicated by the boxes 18 interposed between the virtual machines 14 and IOS 15. HOS 13 maintains control of IOS 15 and permits selected communications from the virtual machines 14 to IOS 15. In accordance with the invention, the supervision of HOS 13 over peripheral operations is minimized, as will become apparent. In the prior art, HOS 13 intercepted each SIO (start input-output) command issued by a virtual machine 14 and adjusted all of the addresses in the command chain appended to each SIO. Practicing the present invention, inter alia, allows HOS 13 the luxury of not intercepting each and every IO command by supplying to the peripheral system 10 certain control data which the peripheral system 10 uses to accommodate the various characteristics assigned to the virtual machines 14.

In peripheral data storage system 10, paging and swapping data are stored in a backing store having a plurality of storage devices 16 constituting a lower level of a two-level hierarchical store. The backing store 16 consists of a plurality of DASDs (direct access storage devices) D0, D1 . . . . In the illustrated embodiment, a single so-called string of such DASDs D0, D1 . . . are shown. The operation is such that 4,096 byte blocks of data are rapidly transferred between host 11 and the DASDs. Each of the devices is independently accessed via any one of a plurality of device or access addresses for each of the devices. Such access addresses are in an address form indicated by numeral 20. The control unit or system 10 address is indicated by portion CU which typically can be three bits. The actual or physical device address is indicated in portion DEV, which for eight devices has three bits. Modifying the actual address of the devices 16 is an access or exposure address modifier AC, which in the present embodiment consists of two bits. The addressing of device D0 by the four accesses includes a direct acess in which the AC portion is zeros and the device portion is also zeros. Three additional accesses to device D0 are via a cache 40 and are identified by the AC bit patterns 01, 10, and 11. The actual device address for all three accesses remains the same. When host 11 accesses the data on a device using one of the four accesses, including access to the data via cache 40, each of the accesses is treated as a separate logical device such that a plurality of independent input-output operations is performed with respect to any given device, one independent operation for each of the accesses. Depending upon the electronic circuit configuration of a particular system 10, device D0 can be accessed by the access addresses simultaneously and independently of accessing cache 40 by one of the three indicated cache-related device access addresses. The addresses can be provided by host 11 over any one of a plurality of connections represented by numeral 12, as can be any of logical device accesses. Device D1 is accessed directly by an address consisting of AC being 0 and the DEV portion being 001. The logical device or cache accesses are similarly patterned as described for logical device accesses for D0. The other devices D2-D7 (not shown) are similarly addressed.

The front store, or upper level of the paging store hierarchy of peripheral system 10, includes a system storage 30 which is operationally accessed and controlled by control 31. Signal transfers between system storage 30, control 31 and host 11 are via a plurality of channel adapters collectively denominated 32 and individually denominated CAA, CAB, CAC, and CAD in FIG. 4. These channel adapters are those attachment circuits found in control units attaching to IBM computers via the input-output interconnections 12. Signal transfers between devices 16, system storage 30 and control 31 are via a set of data flow circuits 33 which convert the usual digital signals found in data processing systems to a serial format and protocol usable with disk storage apparatus, such as is well known in the art. Data flow circuits 33 in turn transfer signals through device adapter 34, also denominated DAA, then through disk controlling adapter 35, also denominated DCA. Devices 16 are addressed by an address DCHR wherein the D corresponds to the device address DEV, C indicates the cylinder address, H indicates the head address, while R indicates the record number. The record can be rapidly located by rotational position on the disk storage apparatus, as is well known. System storage 30 has three major portions: the first and larger portion 40 is a cache for storing paging data to be rapidly accessed by host 11 and for storing paging data to be written to devices 16 such that host 11 need not wait for the devices 16 to accept such data. The principle of caching devices 16 is well known. Access to the data stored in cache 40 is via a directory 43 consisting of a plurality of registers which contain signals identifying the address of devices 16 (DCHR), the address of registers in cache 40 where the data is stored and other control information, as will be described later with respect to FIG. 5. Since cache 40 is relatively large, i.e., several megabytes, access to the cache 40 is enhanced by employing a so-called hashing technique implemented in hash circuit (not shown). Hashing addresses is well known and the method of hashing is not pertinent to an understanding of the present invention and hence is not further described. A plurality of entries relating to a given hash output is called a hash class and is linked together using a singly- or doubly-linked list such that a single access to directory 43 results in an effective complete scan of directory 43 for a given storage address. Cache 40 transfers signals with channel adapters 32 and data circuits 33 over an internal bus 41, 42. The details of transfer of such data signals between the random access memory used for system storage 30 and devices 16 are well known and not further described for that reason.

Control 31 has three major portions: The first portion address and command evaluator (ACE) 50 connects to channel adapters 32 via bus connection 51. ACE 50 receives various input-output or peripheral commands from host 11 via channel adapters 32, partially decodes same and determines whether or not the address provided with a command from host 11 is a direct access or a logical access (as explained earlier) with respect to the addressing scheme for devices 16. When a direct access is indicated, communications from ACE 50 proceed to direct access control DAC 56. DAC 56 is constructed using the techniques for control units which couple direct access storage devices 16 to host 11, such access controls are well known and not detailed with respect to such direct access. Operation of host 11 through DAC 56 to devices 16 includes the ability to reserve the devices 16 to host 11 via any one of the channel adapters 32. This means that access to the selected device is limited to a specific channel adapter 32. The principles of reserve and release as practiced with IBM computers are well known and are not further described for that reason.

ACE 50 in receiving the commands with associated addresses from host 11 can detect one of the three logical accesses for accessing data via cache 40. In this instance, ACE 50 communicates with cache access control CAC 61 via path 60 for accessing cache 40 to lodge paging data into cache 40 or to retrieve paging data from cache 40. When a logical access is specified with the command received from host 11, devices 16 cannot be reserved; that is, if device D0 is reserved to channel adapter CAA for access by host 11, host 11 can send an independent request for data through CAC 61 to system storage 30. In the event the requested data is not in cache 40, CAC 61 via path 68 accesses device D0 through DAC 56 even though device D0 is reserved for accessing to channel adapter CAA. In this manner, paging data can be transferred to cache 40 and relayed to host 11 independent of the device reserve; typically for one of the guests.

Figure 4:
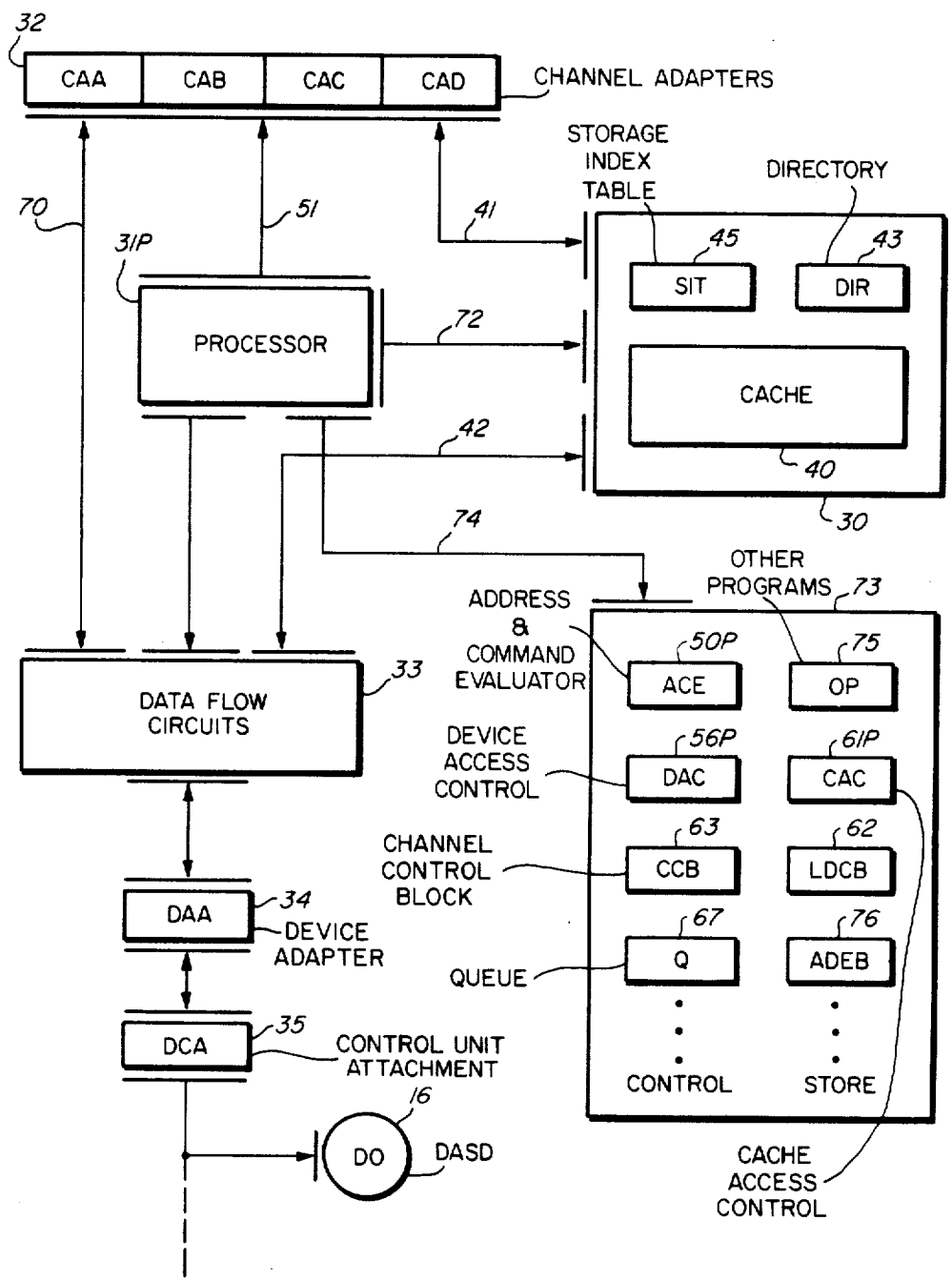
FIG. 4 is a block hardware diagram of the peripheral data storage system shown in FIG. 1 for illustrating the microcode control exercised through the illustrated hardware for practicing the present invention.

CAC 61 operates with a plurality of status indicating registers. For example, LDCB (logical device control block) registers 62 of control store 73, as later explained with respect to FIG. 5, contain control information bearing signals relating to the logical device accesses of cache 40 such that each requested access to a device is independently handled by system 10. The transfer of data signals via bus 41 (FIG. 4) between cache 40 and channel adapters 32 is indicated by signals stored in a set of registers termed channel control block CCB 63 (FIG. 4). Access to cache 40 is by requesting a hash operation to hash circuits (not shown). Once the hash circuits identify the correct entry in directory 43, the entry is transferred from system storage 30 to a set of registers ADEB (active directory entry buffer) 76 in control store 73 such that CAC 61 can operate with cache 40 without referring further to system storage 30 to obtain desired control information. If the directory 43 indicates that data requested through a logical access is not in cache 40, i.e. there is no directory entry, then the requested data must be transferred from a device 16 to cache 40 for relaying to host 11. This transfer is achieved in a highly asynchronous manner by queuing such device read requests in a lead-in register (not shown) of control store 73. Later CAC 61 requests DAC 56 via path 68 to access devices 16. When DAC 56 has transferred the data signals from devices 16 to cache 40 via bus 42 (FIG. 4) which may be combined with bus 41 when simultaneous transfers to and from cache 40 are not implemented (see FIG. 1), DAC 56 notifies CAC 61 via path 68 that paging data has been staged or promoted to cache 40. Then CAC 61 supplies an appropriate indicating signal to host 11 such that host 11 can then rerequest the data from peripheral system 10 whereupon the data will be promptly relayed to host 11 from cache 40. Such procedures are known in the prior art and have been referred to as channel command retry when used in connection with IBM data processing systems.

The input-output commands supplied by host 11 to peripheral system 10 are those used in connection with operating disk storage apparatus. Other commands for the logical accesses include a set paging parameters command which primes CAC 61, as will be described, for handling commands from guests. Such set paging parameters command alters the data structures of FIG. 5 which are stored in control store 73 (FIGS. 1, 4). Control store 73 is accessed by control 31 in executing the ACE 50 functions as indicated by path 52, the CAC 61 functions with control store 73 as indicated by path 53 and DAC 56 functions with control store 73 as indicated by path 57. DAC 56 controls data flow circuits 33 via path 58 while channel adapters 32 access circuits 33 via path 70, which can be a portion of the FIG. 1 single bus 41, 42. Doubleheaded arrow 24 represents a coaction within system 10 between the data structures of control store 73 and cache directory 43. The guest operates with logical or virtual addresses. The LDCB 62 coordinates the logical or virtual addresses of the various guests with the physical addresses used by peripheral system 10 for accessing data from backing store 16. Directory 43 points to data within the cache 40 based upon both the logical and physical addresses. Device 16 access is determined by a peripheral address (for a guest, the virtual address plus a base address) with verification of the access being performed by compare of the received logical address with the stored logical address.

Figure 2:
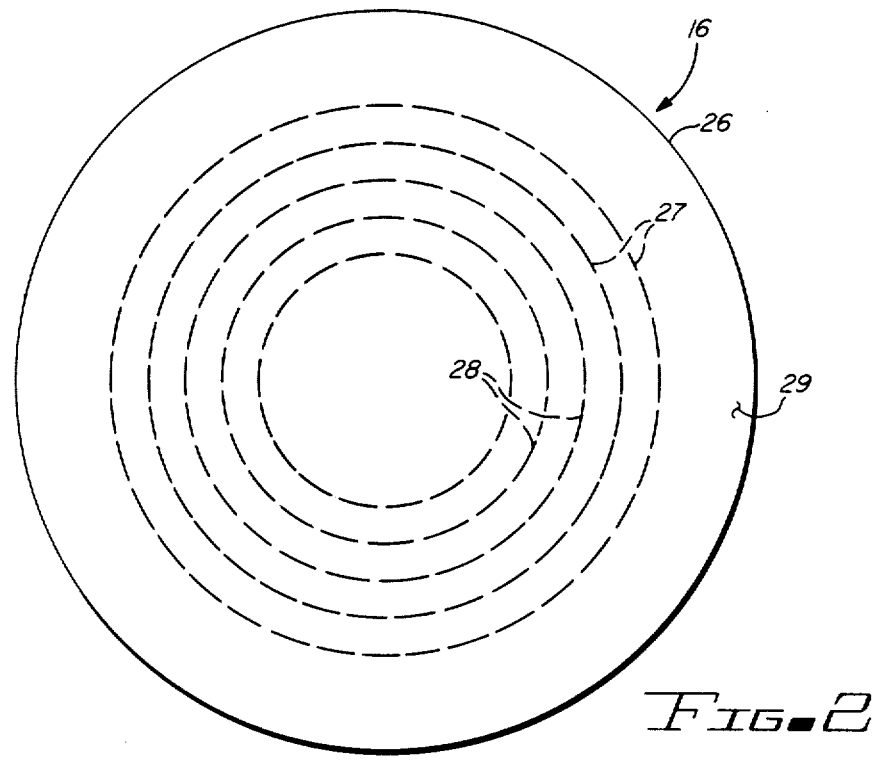
FIG. 2 is a diagrammatic showing of a storage surface of a direct access storage device (DASD) incorporated into the FIG. 1 illustration.

FIG. 2 is a diagrammatic showing of a record surface of device D0. Disk 26 has a recording surface which is addressable by identifying any one of a number of a large plurality of concentric record tracks (not separately shown). Allocation of these record tracks is governed by host 11. In host 11 each of the guests is assigned a so-called minidisk which is a segment of the record storage surface 29 of disk 26—concentric circles 27 denote an address area of a plurality of concentric tracks of a given minidisk while concentric circles 28 represent a second minidisk. The address structure for the respective minidisk is by base offset addresses wherein the base address is represented by the outermost concentric circle in circle pairs 27, 28. The received logical address from the guest provides the offset. The total physical address is a combination of logical and base addresses to identify a given concentric track containing the record area to be accessed. The guest's logical address also is stored within the minidisk area on surface 29. Accordingly, when the appropriate record track has been accessed and data is read from the track for verifying that the correct track has been accessed, the identifying data stored on that accessed track should correspond to the received logical address. For example, the base address may have physical track number 500 which corresponds to a track 0 in cylinder 0 of the minidisk.

Figure 3:
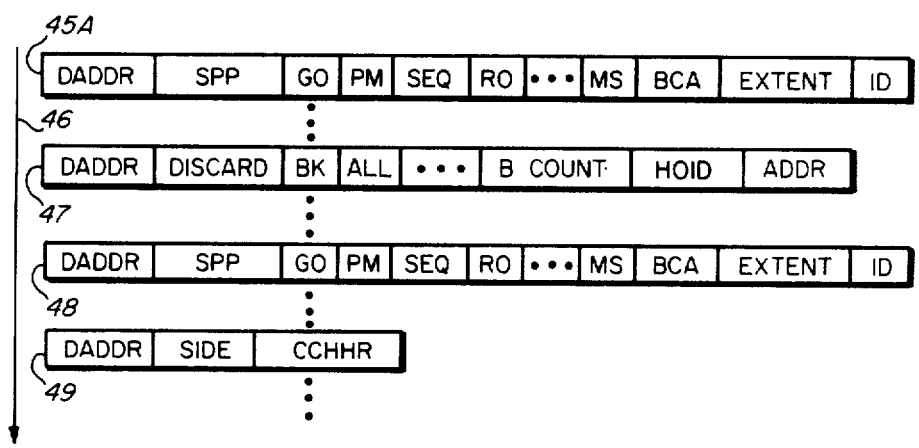
FIG. 3 is a diagrammatic showing of a plurality of channel-originated peripheral commands used in connection with the FIG. 1 illustration for practicing the present invention.

The various peripheral or input-output commands receivable by peripheral system 10 from host 11 within a chain indicated by arrow 46 in FIG. 3 include four new channel commands. Channel command 45A is a set paging parameters (SPP) command for a given device indicated by device address DADDR. Whether or not a guest operating system is involved in the chain 46 is indicated in command 45A by the bit GO. Bit PM indicates whether or not paging mode is implemented, i.e. whether the data should be accessed directly from backing store 16 or via cache 40. Bit MS indicates that the peripheral system 10 is to modify the received logical addresses from the guests for accessing data in accordance with the addressing structure of backing store 16. When MS=0 the received addresses are treated as physical addresses. Bits BCA are the base cylinder address corresponding to the outer dashed circles of the concentric circle pairs 27, 28. EXTENT indicates the permitted extent of operations identified in terms of physical addresses, i.e. the actual physical addresses of devices 16. ID indicates the identification of the virtual machine supporting the guest operating system sending the commands within chain 46. A plurality of the usual peripheral commands may be received by system 10 from host 11 after receiving SPP 45A.

A supervisory command 47 can activate peripheral system 10 to selectively discard data from cache 40 whenever host 11 or any of its virtual machines 14 indicates to system 10 that such data is no longer needed and need not occupy storage space in cache 40. The devices D0, D1 . . . are indicated by DADDR portion. The command DISCARD indicates the function to be performed. BK bits indicate that a B count field indicates the number of blocks to be discarded. The number of blocks begins at backing store address ADDR which is in the CCHHR format of DASD for the device indicated by DADDR. The identification of the sending operating system is given in HOID for host operating identification. The ALL bit indicates that all of the data in cache 40 is to be discarded. The ALL bit is only honored when HOID points to HOS 13. When a guest operating system supplies the DISCARD 47 command with the ALL bit set, that command is then treated as a no operation. In the alternative, when the minidisks are accurately defined within system 10, the ALL bits result in system 10 discarding all of the data within cache 40 identifiable by the minidisk storage area. Following a DISCARD 47 command, other commands may be received.

A second SPP command 48 may be received which changes the operation of the peripheral system 10 in accordance with the above-described parameters for the remaining commands within chain 46. As an example, the extent of addresses addressable within the chain 46 may be changed for the subsequent commands. Generally, the GO bit and the BCA area are not changed. At 49 a search identification equal SIDE command using a CCHHR format for a given DADDR is received. The CCHHR is a virtual address to be translated by system 10 as will become apparent, i.e. the CCHHR for guest operating systems is a virtual address. In the event that the GO bit is 0, i.e. a host operating system HOS 13 is using the peripheral system 10, then CCHHR is a real or physical address rather than a virtual address.

Before proceeding further with the description of invention, a preferred hardware implementation for supporting the practice of the present invention is described with respect to FIG. 4. Control 31 is implemented in a computerized form which includes a digital processor 31P which communicates directly with channel adapters 32 via path 51. Data flow between the host 11 and devices 16 is via a bus 70 extending directly from channel adapters 32 to data flow circuits 33. Channel adapaters 32 have known switching circuits for switching to and from bus 70, as is practiced in most present-day data processing peripheral control units. Processor 31P controls data flow circuits 33 via bus 70, as is well known, and communicates with system storage 30 via bus 72. Bus 72 typically will carry address signals, read command signals, write command signals and the like to system storage 30. Processor 31P is controlled by a set of so-called microcode programs stored in control store 73, a random access storage. Processor 31P fetches the microcode programs via bus 74 to enable processor 31P to perform all of the control functions described for control 31. For example, address and command evaluator 50 has its functions performed by processor 31P executing programs ACE 50P. In a similar manner, direct access control 56 has its functions performed by processor 31P executing programs DAC 56P. In a similar manner, cache access control 61 corresponds to programs CAC 61P. Of course, operating a storage system requires many other programs for diagnostic purposes and the like indicated by OP (other programs) 75. Control store 73 also contains the addressable registers LDCB 62, ADEB 76, the queuing registers 67, CCB 63, plus other control data structures and registers not pertinent to the present invention. For example, the hash circuits can have their functions performed in OP 75. FIG. 4 shows a separate bus 41 and 42 to provide independent data transfers between cache 40 and adapters 32 and circuits 33.

Figure 5:
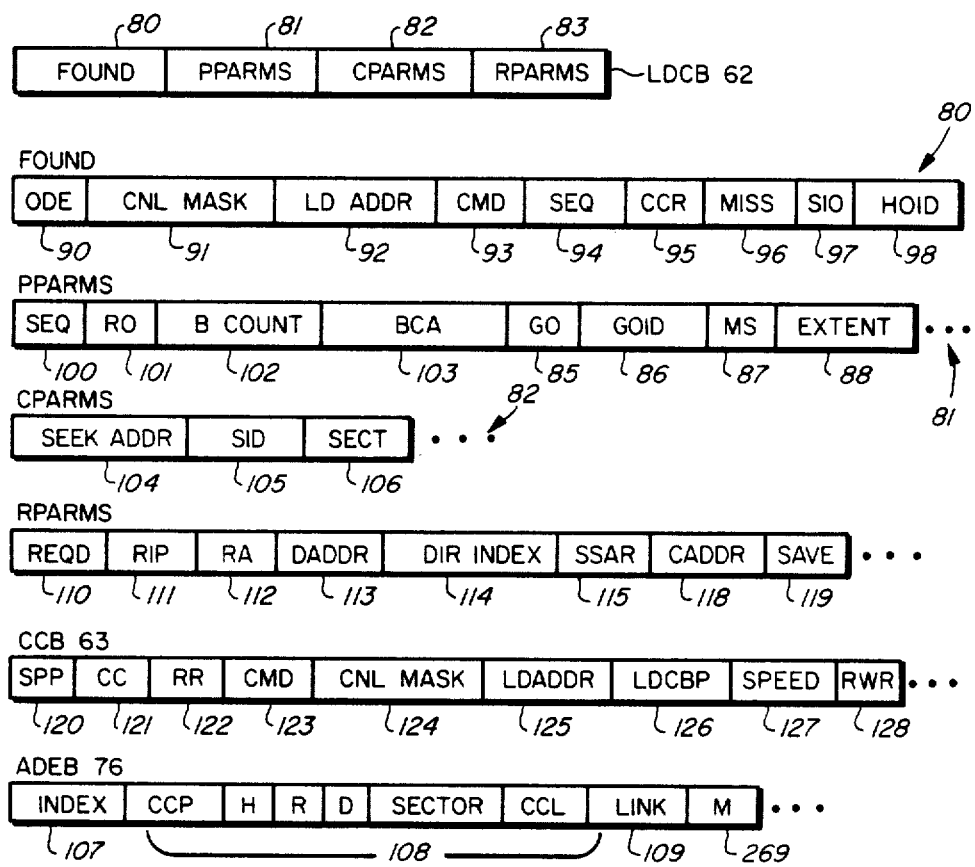
FIG. 5 is a diagrammatic illustration of control data structures used in connection with the FIG. 4 illustrated peripheral system.

Before continuing with the detailed description of the operation of the present invention as embodied in FIGS. 1 and 4 illustrated peripheral storage system 10, the registers for containing control data necessary to successfully practicing the invention in the illustrated embodiment are described with respect to FIG. 5. LDCB 62 contains control data for processor 31P to successfully process all peripheral system 10 actions with respect to each of the logical devices represented by the addresses with respect to address structure 20. Accordingly, there are three logical device control blocks for each of the devices 16. In an eight device storage system 10, there would be 24 logical device control blocks 62. The direct access to devices 16 handled through DAC 56 does not require a logical device control block since the DAC 56 handles the accessing as in prior art disk-type data storage systems.

LDCB 62 is best understood by arranging the control data into four major portions. A first portion, foundation 80, relates to that control data describing the basic architectural functions of the illustrated embodiment. PPARMs 81 (paging parameters) contain control data relating to the set paging mode parameters command received from host 11. CPARMs 82 (command parameters) contain control data relating to set sector, seek and search ID commands received from host 11. RPARMs 83 (read parameters) relate to those control data for accessing devices 16 for the purpose of transferring data signals to cache 40 from devices 16.

Foundation portion 80, insofar as the practice of the present invention is concerned, includes the following control data fields: ODE 90 is a single bit indicating a device end (DE) is owed to the host with respect to the logical device associated with the present LDCB. Channel mask (CNLMASK) 91 indicates which of the channel adapters 32, hence which of the channels, of host 11 has activated the logical device for accessing data areas of an identified device 16 via cache 40. Within a chain of peripheral commands a given adapter 32 relates to one guest or host operating system. The logical address 92 (LDADDR) identifies which of the logical addresses is associated with the LDCB. For example, device D0 LDADDR 92 contains the bit pattern 01000 for a first of the three logical devices. As a practical matter, the addressing of the LDCBs is by logical device address used as an offset from a base address. The LDADDR section 92 constitutes a verifying and seek identifying function of LDCB 62. Any command received from host 11 that is currently active in the system 10 for the identified logical device is stored in CMD 93. SEQ 94 is a single bit identifying whether or not sequential data access has been indicated by host 11. This bit being active indicates that the host 11 will read a succession of paging blocks of data primarily in a predetermined sequence. CCR 95 is a bit indicating that a channel command retry (CCR) is in progress, i.e. has been sent to host 11. Channel command retries are part of the known IBM input-output system operations and are used when a cache 40 miss occurs. MISS bit 96 indicates that a scan of DIR 43 indicated a MISS condition, i.e. no desired data area is in cache 40. SIO 97 indicates that a START IO has been received, i.e. the onset of a new chain of commands has been indicated in an earlier command by host 11. HOID 98 contains the identification of the host operating system controlling the system 10 for the commands of the present chain. Other control fields, of course, would be found in this area, but those are not pertinent to the present invention.

PPARMs 81 include SEQ 100 for indicating that a number of contiguous block addresses will be referenced by host 11. SEQ 100 contains the same information as SEQ 94. RO 101 indicates that any paging blocks transferred from cache 40 through a channel adapter 32 to host 11 as a result of a read command received from host 11 may be invalidated following the data transfer. B COUNT 102 indicates the current number of paging blocks yet to be processed. BCA 103 indicates the base cylinder address received during execution of a set paging mode parameters command and identifies the outer dashed circle of a minidisk area, such as area 27. GO 85 indicates that a guest is sending commands, GOID 86 identifies the guest operating system of a virtual machine 14, MS 87 indicates that system 10 is accommodating the guest characteristics (received addresses are virtual addresses), and EXTENT 88 indicates the permitted range of backing store addresses that may be accessed via the logical device. Such range has an upper and lower limit in CCHHR format. Other fields not pertinent to the present invention would also be included in PPARMs 81.

CPARMs 82 contain the SEEK ADDR 104 which contains the address of device 16 together with its cylinder and track addresses for performing a disk storage apparatus seek, as is well known. SID 105 contains the search identification argument. SECT 106 contains the current set sector value, i.e. the rotational position of disk storage apparatus for accessing a paging block.

RPARMs 83 include REQD 110 for indicating that access to a device 16 is required to satisfy a host request, i.e. data has to be transferred from device 16 to cache 40 for relaying to host 11. RIP 111 indicates that a current transfer from a device 16 to cache 40 is in progress. RA 112 indicates that some postprocessing for the device 16 transfer to cache 40 is in progress. Other control flags for indicating status of the relationship between devices 16 and cache 40 can also be included in the RPARMs 83. DADDR 113 contains the address of the device 16 involved with the read operation. DIR INDEX 114 is an index to directory 43 which is used for calculating the address of the corresponding entry in the directory indicated by DADDR 113 and the corresponding cylinder head and record identification. SSAR 115 contains the identity of the storage address register of system storage 30 which will be used in connection with reading a paging block from device 16 to system storage 30. In this regard, system storage 30 has a plurality (8 to 16) of address registers which are addressable for facilitating more rapid data transfers between the host 11 and cache 40 as well as between devices 16 and cache 40. CADDR 118 contains a current address of the cache block for transferring signals between cache 40 and devices 16. SAVE 119 is a temporary save area for parameters for disconnected operations as is practiced in the usual manner in data processing, particularly in the control of peripheral devices.

CCB 63 includes SPP bit 120 which signifies whether or not a set paging mode parameters command has been received. The set paging mode parameters command enables access to system storage 30 for operation in a paging mode. CC bit 121 indicates that command chaining has been set up by host 11. Command chaining is that operation tying a set of commands together as is widely practiced in the data processing art. RR bit 122 indicates a read retry is active in system storage 30. For example, an error condition can occur; recovery from that error condition may require a read retry. Details of the retry are not shown in the present description. CMD 123 contains the current or last command received from host 11 which is currently being handled in peripheral system 10. CNL MASK 124 identifies which channel adapter 32 conveyed the CMD 123 contents to control 31. LDADDR 125 contains the address of a logical device currently selected by host 11. LDCBP 126 is a pointer or address value pointing to the LDCB 62 associated with the current logical device. SPEED 127 indicates the data rate of a connected channel. RWR 128 relates to overrun counts before retry is avoided; since thresholds for retries is well known, such action is not described in the present application. CCB 63 may contain additional control bits and fields as design practices dictate.

ADEB 76 contains one entry of DIR 43. Accordingly, the description of ADEB 76 will also describe DIR 43. INDEX 107 is the logical address of the instant directory entry. This field provides self-identifying data in each entry. INDEX 107 contains the same information as contained in DIR INDEX 114 of RPARMs 83. Section 108 contains the address of the device 16 which contains the data which may be replicated in cache 40 or is to be replicated in cache 40. CCP indicates the cylinder address of the physical device while CCL indicates the logical cylinder address of the device. H indicates the head address, i.e. which surface of the device 16 is to be accessed, D is device address, R is the record number and SECTOR contains the sector address, i.e. rotational position. D corresponds to DADDR 113. From the above, it can be seen that LDCB 62 provides all of the controls for the logical devices while CCB 63 and ADEB 76 contain the controls for the devices 16 independent of the logical device. That is, operation of peripheral system 10 between the devices 16 and system storage 30 is the same for all logical devices. Control 31 provides the separation and continuity of logical devices which exist between host 11 and system storage 30 for providing multiple access to disk storage apparatus 16. LINK 109 of ADEB 76 links the entries of DIR 43 of each hash class. In other words, hash 44, via SIT 45 accesses a first entry of DIR 43. If that entry is non-compare, then link 109 is used to fetch a second entry from DIR 43 which is in the same hash class and therefore identified by the SIT 45 indication for DIR 43. At the end of the hash class, link 109 is all zeroes to indicate end of hash or chain of DIR 43 entries. If all zeroes are encountered in SIT 45, a miss has occurred. Of course, DIR 43 can contain additional fields for each entry which is beyond the scope of the present description.

Operations between system storage 30 and backing store 16 are asynchronous and substantially independent of operations between host 11 and backing store 16 as well as the operations between host 11 and system storage 30. To achieve this, a set of FIFO (first in, first out) read queues and write queues is established in a set of queue registers (not shown) in control store 73.

Figure 6:
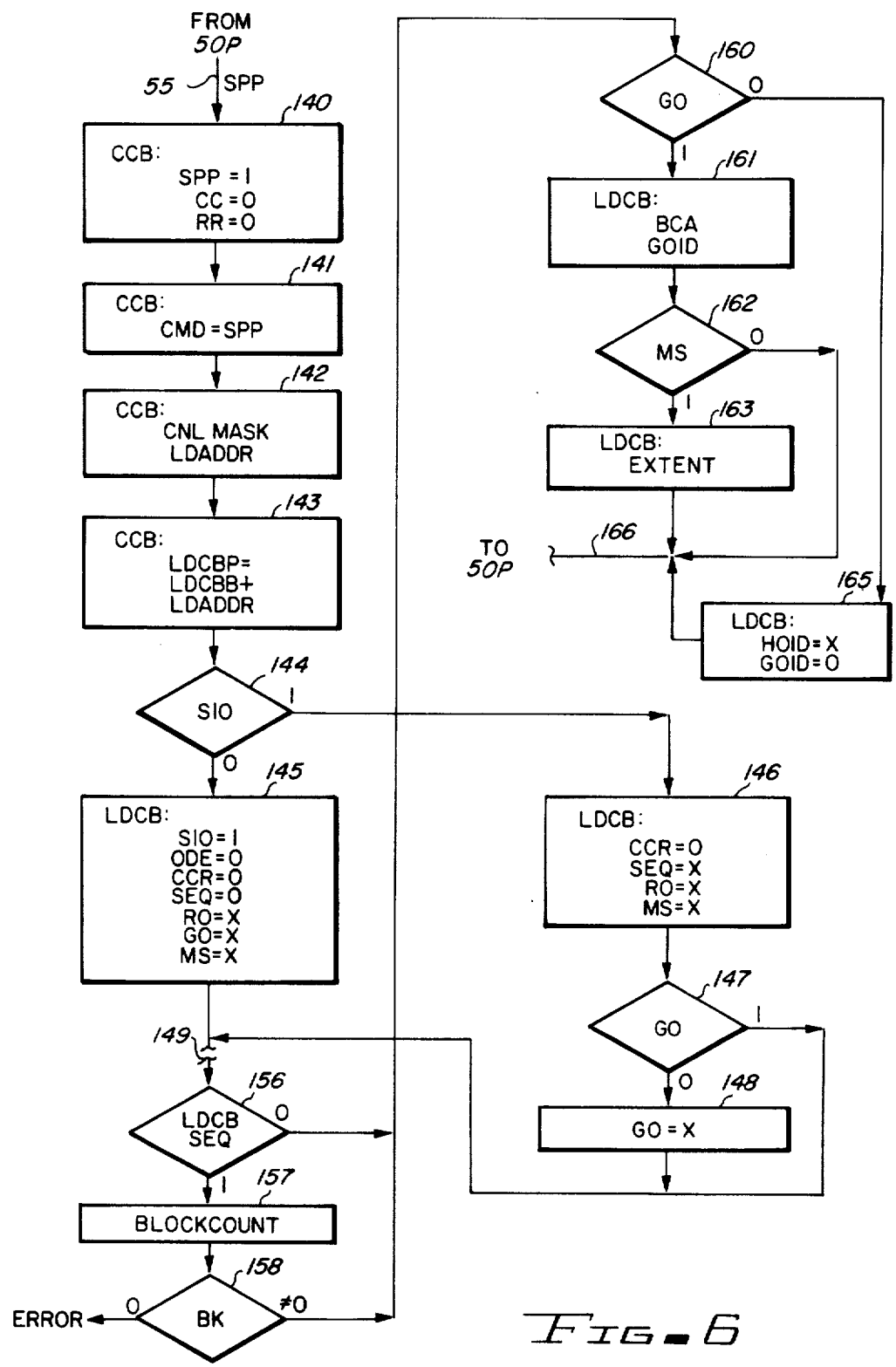
FIG. 6 is a machine operation chart showing command execution by the FIG. 4 illustrated system for a mode setting command.

Execution of the SPP command is shown in the FIG. 6 machine operations chart. Activation of set paging mode logic steps is via path 55. At step 140, CCB 63 is accessed for setting SPP 120 to unity, CC 121 to 0, and RR 122 to 0. This initializes CCB 63 for execution of the set paging mode parameters command. Then at 141, CCB 63 is again accessed for setting CMD 123 equal to the code permutation representing SPP. At 142, CCB 63 is again accessed for transferring a channel mask to CNLMASK register 91 (FIG. 5) of LDCB 62 corresponding to the logical device address LDADDR (ACDEV in FIG. 1). Then at 143, the LDCB 62 pointer is generated and transferred to LDCBP 126 of CCB 63. The LDCB 62 pointer consists of the base address of the LDCBs (LDCBB) as modified by the logical device address LDADDR. At 144, SIO 97 is checked; if SIO=0 a new chain of command is beginning such that preparatory step 145 follows. In the LDCB 62 corresponding to the pointer generated in step 143, logic step 145 peripheral system 10 to evaluate that an SIO (start input-output) has been received by setting SIO 97 to unity when SSP is the first command in a chain, ODE 90 is reset to zero, CCR 95 is reset to zero, and SEQ 94 is set to the value received in the set paging mode parameters command; that is, whether or not a sequential operation is to be performed. In a similar manner, read and discard, a paging parameter which is selected by the set paging mode command, is inserted into RO 101 of PPARMs 81.

When SIO 97=1, the SPP command is not the first command in a chain. Then at 146 LDCB 62 is accessed for resetting CCR 95 to zero and SEQ 94, RO 101 and MS 87 are set to the values indicated in the SPP command, such as command 48 of FIG. 3, respectively. This action recalibrates system 10 to the just-received SPP command. At 147 GO 85 is examined to determine whether or not a guest is the source of commands as may be evaluated in an earlier SPP command. When GO=0 then at 148 GO of the received SPP command determines the value of GO 85. In other words, a guest may be substituted for HOS 13 within a chain but the guest cannot remove its own guest indication for obtaining a different control over system 10 than indicated by HOS 13. When GO 85 is unity, no action is taken. For system integrity, the GOID, MS and BCA values stored in the LDCB are only changed by an SPP command when the GO bit in that command is set to unity.

Some nonpertinent logic steps are performed at 149 by processor 31P; then at 156, LDCB 62 is examined at the logical address for determining whether or not sequential bit SEQ 94 has been set to the active condition. If not, at 160 processor 31P examines GO 85 to see if the present chain of command is sourced from a guest. If not, the contents of HOID 98 of LDCB 62 is set to the contents of HOID in the SPP command contained in the ID field (FIG. 3) and GOID 86 is reset to zero. In other words, HOS 13 is the source of the commands in this particular chain. If GO 85 is unity, then at 161, BCA 103 and GOID 86 are updated in accordance with the values in the SPP command fields BCA and GOID, respectively. At 162 MS 87 is examined to determine whether or not system 10 is to modify the received virtual address from the guest. When the modification is to occur, extent of access is important. Accordingly, at 163 LDCB EXTENT area is updated to the EXTENT value set forth in the received SPP command such as command 48 of FIG. 3. Then via logic path 166 ACE 50P is returned to for reporting a successful execution of the received SPP command from host 11. Such reporting follows normal control units final status reporting for figures.

For sequential bit 94 active at logic step 156, the received block count is set at 151 into section B COUNT 102 of PPARMs 81 in LDCB 62. When the sequential bit is active, set paging mode parameters command has a byte of modifier data indicating the number of blocks to be transferred in the current chain of commands. At 158, the block count is checked—if it is zero, an error has occurred, i.e. it is improper for host 11 to indicate a transfer of zero blocks. If it is nonzero, a logic path to steps 160-165 is followed.

Figure 7:
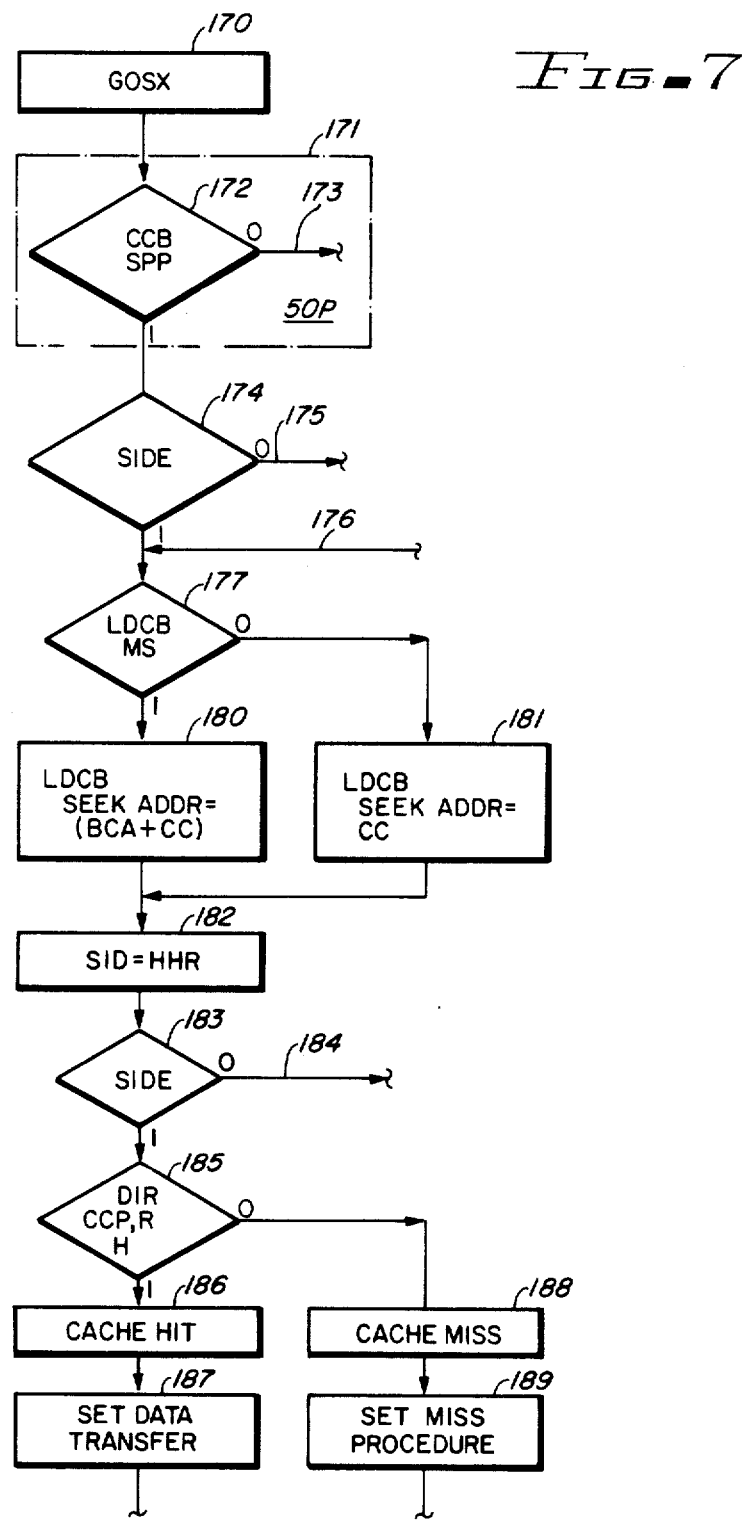
FIG. 7 is a machine operations chart relating to the operations of FIG. 4 illustrated system command execution of a data access command received by the peripheral system from the host.

FIG. 7 illustrates preparatory machine operations for executing a command received from a guest. The guest is represented in FIG. 7 as GOSX 170, i.e. guest number X having guest operating system. The command transmitted to system 10 is decoded by ACE 50P using normal decoding procedures. A portion of ACE 50P pertinent to the understanding of the FIG. 7 illustration is enclosed in dash line box 171. Therein branch operation 172 examines CCB 63 section SPP 120. If SPP is zero, then the paging mode, i.e. access of cache 40, is not employed in the chain; rather a direct access via DAC 56 is being encountered. Accordingly, processor 31P follows path 173 to execute the direct device access via DAC 56P. For the paging mode, at 174 processor 31P examines whether or not the received command is a search ID equal (SIDE) which signifies that an ensuing data transfer operation will occur. For no data transfer operations, the steps of FIG. 7 ae not pertinent; hence, processor 51P follows logic path 175 to perform other operations related to the received command not pertinent to an understanding of FIG. 7. For a received SIDE command, processor 31P at 177 examines MS 87 of LDCB 62 to determine whether or not the virtual address received with the SIDE command can be used directly or has to be adjusted in accordance with the guest characteristics. In this regard, logic path 176 signifies that the machine operations of FIG. 7 can be activated internally of system 10 as by CAC 61P activating DAC 56P shown in FIG. 4. When MS 87 is zero, at 181 LDCB 62 is accessed to fetch the cylinder address CC from LDADDR 92 (remember the logical address received from the guests is in the CCHHR format). Then SEEK ADDR 104 is made equal to the CC portion of LDADDR 92. The SEEK ADDR portion of CPARMs 82 is used by other programs OP 75 to search DIR 43 in the paging mode to determine whether or not space is allocated within cache 40 for that particular address. Otherwise, at 180 LDCB 62 is accessed such that SEEK ADDR 104 is made equal to the contents of BCA 103 plus the CC portion of LDADDR 92. This is the adjustment made by system 10 for adjusting the logical address to the physical address, i.e. all seeks in the DIR 43 or in the device D0 are based upon physical addresses and therefore the virtual addresses must always be adjusted to such a physical address. In this manner, both guest and host operating systems can be intermingled in a succession of chains without undue control in the host 11. Following steps 180, 181, processor 31P at 182 transfers the HHR portion of LDADDR 92 to SID 105. Accordingly, in CPARMs 82, SEEK ADDR 104 contains the CC portion while SID 105 contains the HHR portion of the address. DADDR portion of the address is still contained in LDADDR 92. At 183 processor 31P again checks to see if the received command is a SIDE command. If not, logic path 184 is followed to perform functions in OP 75 relating to the entry to the machine operations via logic path 176. Such operations are beyond the scope of the present description. For a SIDE command at 183, processor 31P examines DIR 43 via ADEB 76 to see if there is an area of cache 40 related to the address for the addressed device at a location corresponding to SEEK ADDR 104 and SID 105. This constitutes comparing the H and R and CCP sections of ADEB 76 section 108 for a device. In section 108 of ADEB 76 corresponding to DADDR in LDADDR 92, for a cache hit, i.e. space is allocated in cache 40, processor 31P at 186 signifies a cache hit (procedure not detailed) and then at 187 sets the data transfer for transferring data between host 11 for guest number X and cache 40, either read or write. On the other hand, for a cache miss, the miss is noted at 188 (details not shown) and the miss procedure is set up at 189. Such miss procedure will include an asynchronous transfer from backing store 16 to cache 40. Included in this miss procedure is setting CCR 95 in foundation portion 80 of LDCB 62. ACE 50P senses CCR 95 and forwards a channel command retry to host 11 causing it to wait until system 10 has transferred data from backing store 16 to cache 40. In the alternative, backing store 16 could be accessed directly by host 11 through direct data transfer bus 70 using known direct accessing techniques.

FIG. 8 is a simplified flow chart showing the flow of control using a guest operating system and a host operating system. HOS 13 supplies a first command in a chain of commands identifying the device by DADDR with a set paging parameters command SPP. A guest operating attribute is indicated with a base cylinder address BCA, all at 190. This information is stored at LDCB 62 for use by system 10 for handling commands received from a guest operating system. GOS0 14 supplies a command within the chain or a next occurring following the first command at 190 to supply a SIDE command at 191. Such SIDE command includes a device address and the address CCHHR in a logical or virtual sense. At 192 processor 31P modifies the received CC by BCA to calculate the device CC in a physical sense. The processor 31P then sends the physical address MDCCHHR at 193 for accessing cache 40 via DIR 43 or accessing a device 16 in backing store via data flow circuits 33 and adapters 34, 35. It should be noted that either HOS 13 or GOS0 14 can use the virtual addressing scheme for generating the modified device CC address (MDCC).

FIG. 9 shows machine operations of system 10 for a received DISCARD command such as command 47 of FIG. 3. The machine operations chart relates to DAC 56 operations subsequent to decoding of the command by ACE 50P using known decoding techniques. At 195 DAC 56P (operated by processor 31P) examines to see if the command is a DISCARD command. If not a DISCARD command, other machine operations are executed following path 196. For a DISCARD command, processor 31P at 197 determines if the ALL bit of the received command 47 is set to one or zero. For a zero ALL bit, the GO generated command can be executed within the extent authorized for the GO; at 198 BCA 103 of the LDCB 62 of the addressed logical device is added to the addresses received with the DISCARD command of FIG. 3. At this time the permitted access extent of the identified GO is checked. If the access extent is violated, an error is signalled to the host and no blocks are discarded. Alternately, only the blocks within the access extent can be discarded and the rest ignored. Processor 31P follows logic path 199 to discard the blocks stored in cache 40 at 200 by erasing the appropriate DIR 43 entries. The final status of the DISCARD command is then reported in a usual manner. If the ALL bit equals one in the received DISCARD command 47, processor 31P examines GO 85 (FIG. 5) to see if the chain of commands is associated with a guest. For an HOS 13 related command chain, processor 31P at 206 effectively erases the cache by destroying the addressability of all data in the cache through erasure of the appropriate DIR 43 entry. Final status is reported by ACE 50P following path 207. For a guest-associated chain of commands, processor 31P from step 205 checks the identity of the guest operating system by examining LDCB 62 GOID 86. For a mismatch, errors are reported following path 210. Such error reporting is not detailed since it follows normal error reporting status. For a match of GOID in the DISCARD command section HOID, processor 31P at 209 examines whether or not the SPP command 45A which preceded the DISCARD command had indicated an EXTENT for the guest operating system. If EXTENT was indicated, then the received DISCARD command cannot be executed and it is treated as a no operation following path 210 to ACE 50P for reporting final status. If the EXTENT is nonzero, i.e. an extent has been defined such as defining the extent of a minidisk, at 211 all of the data in the defined EXTENT that is stored in cache 40 is discarded. Then final status is reported by ACE 50P following path 212.

FIG. 10 illustrates system 10 operations which reset the guest operating controls following the completion of a chain. That is, it may be desired that the relationship between the guest and the system 10 be terminated at the end of a chain. In this manner, the control is always returned to HOS 13 for ensuring system and data integrity. At 220, processor 31P has completed operations and is now executing ACE 50P. At 221 the end of chain (EOCH) is examined. This is determined by examining the SUPPRESS OUT signal from host 11. If the SUPPRESS OUT signal is active, chaining continues and steps 222 and 223 are bypassed such that logic paths 224 allows processor 31P to continue executing ACE 50P in areas not pertinent to understanding of guest control. If the SUPRESS OUT signal is not present at final status time, then the end of chain is indicated. Accordingly, at 222, processor 31P accesses LDCB 62 and resets to zero sections SIO 97 (no chaining is occurring now), CCR 95 (since it is the end of the chain, any channel command retry must be aborted), SEQ 94 and 100 are reset to allow HOS 13 and the guest to indicate different types of data transfer in the subsequent chains, GO 85 is reset such that control of the systems returns to HOS 13, MS 87 is reset to allow control of the virtual adjustment of received addresses, EXTENT 88 is reset such that a new minidisk can be defined, GOID 86 is reset for selecting a new guest for a subsequent chain, R0 101 is reset to eliminate read and discard functions and B COUNT 102 is reset in preparation for receiving a new block count. Then at 223, the contents of CCB 63 are completely reset; hence, channel operations are terminated. Then processor 31P follows path 224 to continue other machine operations not pertinent to an understanding of the present invention.

While the invention has been particularly shown and described with reference to preferred embodiments thereof, it will be understood by those skilled in the art that various changes in form and details may be made therein without departing from the spirit and scope of the invention.

What is claimed is:

1. A peripheral data handling system attachable to a host processor supporting a host operating system and a plurality of guest operating systems (guests), means in said host processor for sending peripheral commands including data storage location addresses to said peripheral data handling system for performing peripheral operations in accordance with said commands wherein said commands supplied by said guests including guest peripheral commands having virtual addresses, and wherein said commands supplied by the said host operating system includes host peripheral commands having real addresses;

the improvement including in combination:

attachment means for being coupled to said host processor for receiving said peripheral commands;

control means in said peripheral data handling system connected to said attachment means for receiving from said host processor a signal indicating that a given chain of commands is sourced from a said guest or said host operating system;

first means connected to said control means and to said attachment means for being responsive to said received ones of said peripheral commands indicated by said signal as being received from said host operating system to translate said received host peripheral commands and execute same in the peripheral data handling system in accordance with the respective command indicators of said peripheral command; and second means connected to said control means and to said attachment means for being responsive to said received ones of said peripheral commands indicated by said signal as being received from a one of said guests to translate said received guest peripheral commands and execute same in said peripheral data handling system in accordance with the respective command indicators in said received ones of said guest peripheral commands and with said signal such that the extent of command execution is adjusted by said peripheral system by first modifying the respective command indicators by said signal and then executing the respective guest peripheral command to accommodate characteristics of said guest within said host processor;

a buffer connected to said attachment means, said control means, said first means, and said second means for storing data and having a plurality of addressable data storage locations and means for addressing said storage locations;

a plurality of peripheral devices attached to said buffer for transferring data therewith and having a plurality of addressable data storage locations wherein each said received guest peripheral command includes a predetermined data storage address location of a one of said plurality of peripheral devices;

said second means being responsive to a said received guest peripheral command from a guest for accessing said storage locations in said buffer and said peripheral devices by modifying the virtual address signals received with said guest peripheral command from a virtual address to a real address by using the respective said predetermined data storage address for the one peripheral device; and said first means having addressing means responsive to said real address received with said host peripheral commands for addressing said storage locations and said peripheral devices in accordance with said received real addresses.

2. The peripheral data handling system set forth in claim 1 wherein said peripheral devices are data storage devices having a given addressing structure; and directory means operatively associated with said buffer for relating addresses of said addressing structure to addresses of said storage location when said buffer is containing data associatable with said addresses of said address structure.

* * * * *